United States Patent
Abadie

(10) Patent No.: US 11,381,322 B2
(45) Date of Patent: Jul. 5, 2022

(54) METHOD OF MEASURING A TOTAL RADIATED POWER OF A DEVICE UNDER TEST AS WELL AS TEST SYSTEM

(71) Applicant: Rohde & Schwarz GmbH & Co. KG, Munich (DE)

(72) Inventor: Vincent Abadie, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/154,347

(22) Filed: Jan. 21, 2021

(65) Prior Publication Data

US 2021/0258084 A1 Aug. 19, 2021

(30) Foreign Application Priority Data

Feb. 17, 2020 (EP) .................................. 20157712

(51) Int. Cl.
| | |
|---|---|
| *H04W 24/06* | (2009.01) |
| *H04B 17/10* | (2015.01) |
| *H04W 88/02* | (2009.01) |

(52) U.S. Cl.
CPC .......... *H04B 17/102* (2015.01); *H04W 24/06* (2013.01); *H04W 88/02* (2013.01)

(58) Field of Classification Search
CPC ..... H04B 17/102; H04W 24/06; H04W 88/02
(Continued)

(56) References Cited

U.S. PATENT DOCUMENTS

| | | | |
|---|---|---|---|
| 7,907,586 B2 * | 3/2011 | Al-Zain | H04W 24/00 370/335 |
| 8,289,818 B2 * | 10/2012 | Taratorin | B82Y 15/00 369/13.01 |

(Continued)

FOREIGN PATENT DOCUMENTS

| | | |
|---|---|---|
| WO | 2015085087 A1 | 6/2015 |
| WO | 2019096802 A2 | 5/2019 |

(Continued)

OTHER PUBLICATIONS

"3rd Generation Partnership Project; Technical Specification Group Radio Access Network; 5GS; User Equipment (UE) conformance specification; Part 1: Common text environment (Release 16)," (3GPP™) TS38.508-1, V16.2.0, Mobile Competence Centre, France; Jan. 14, 2020, 920 pages.

(Continued)

*Primary Examiner* — Hai V Nguyen
(74) *Attorney, Agent, or Firm* — Christensen O'Connor Johnson Kindness PLLC

(57) ABSTRACT

A method of measuring a total radiated power of a device under test by a test system with a base station simulator, a measurement antenna assigned to the base station simulator and a control and/or measurement equipment is described. The method includes: establishing a radio resource control connection between the device under test and the base station simulator via the measurement antenna; activating an uplink-beam lock function at the device under test; and performing a total radiated power measurement by the control and/or measurement equipment while continuously sending a downlink signal from the base station simulator via the measurement antenna to the device under test. A test system is further described.

18 Claims, 2 Drawing Sheets

(58) Field of Classification Search
USPC .......................................... 455/67.14, 67.11
See application file for complete search history.

(56) References Cited

U.S. PATENT DOCUMENTS

| | | | | |
|---|---|---|---|---|
| 8,660,812 | B2* | 2/2014 | Gregg | H04B 17/11 455/67.11 |
| 8,744,368 | B2* | 6/2014 | Kothari | G06F 21/44 455/80 |
| 9,525,642 | B2* | 12/2016 | Varsanyi | H04L 47/323 |
| 9,661,517 | B2* | 5/2017 | Stott | H04B 17/0087 |
| 10,548,181 | B2* | 1/2020 | Siomina | H04W 48/16 |
| 10,763,979 | B2* | 9/2020 | Maruo | H04B 17/15 |
| 10,958,361 | B2* | 3/2021 | Maruo | H04B 17/102 |
| 11,121,808 | B2* | 9/2021 | Chatterjee | H04L 1/0041 |
| 2012/0092972 | A1* | 4/2012 | Taratorin | G02B 21/0092 369/13.29 |
| 2012/0221277 | A1* | 8/2012 | Gregg | H04B 17/11 702/106 |
| 2012/0232826 | A1* | 9/2012 | Rivoir | H04B 7/0617 702/117 |
| 2015/0156130 | A1* | 6/2015 | Varsanyi | H04L 47/323 370/412 |
| 2016/0146873 | A1* | 5/2016 | Su | H04W 24/06 702/122 |
| 2016/0373196 | A1* | 12/2016 | Stott | H04W 24/06 |
| 2017/0195028 | A1* | 7/2017 | Shimezawa | H04W 28/06 |
| 2017/0347270 | A1* | 11/2017 | Iouchi | H04W 72/0446 |
| 2018/0294827 | A1* | 10/2018 | Abdelmonem | H04L 43/0829 |
| 2019/0052294 | A1* | 2/2019 | Abdelmonem | H04B 17/336 |
| 2019/0097756 | A1* | 3/2019 | Chatterjee | H04L 1/0041 |
| 2019/0182855 | A1* | 6/2019 | Babaei | H04W 74/002 |
| 2019/0313475 | A1* | 10/2019 | Siomina | H04W 48/16 |
| 2020/0091608 | A1* | 3/2020 | Alpman | H01Q 25/001 |
| 2020/0119460 | A1* | 4/2020 | Maruo | H01Q 21/29 |
| 2020/0177289 | A1* | 6/2020 | Maruo | H04B 17/3912 |
| 2020/0244377 | A1* | 7/2020 | Maruo | H04B 17/3912 |
| 2020/0280377 | A1* | 9/2020 | Haustein | H04B 17/104 |
| 2020/0341044 | A1* | 10/2020 | Kvarnstrand | H04B 17/309 |
| 2021/0022018 | A1* | 1/2021 | Belov | H04L 5/001 |
| 2021/0055337 | A1* | 2/2021 | Kobayashi | G01R 29/0864 |
| 2021/0055382 | A1* | 2/2021 | Kong | G01S 13/003 |
| 2021/0141099 | A1* | 5/2021 | Gunnarsson | G01S 19/07 |
| 2021/0160036 | A1* | 5/2021 | Reddy | H04L 5/0051 |
| 2021/0160900 | A9* | 5/2021 | Babaei | H04W 72/1289 |
| 2021/0194626 | A1* | 6/2021 | Chatterjee | H04L 1/0057 |
| 2021/0247431 | A1* | 8/2021 | Maruo | H01Q 3/16 |
| 2021/0265742 | A1* | 8/2021 | Lee | G01R 29/10 |
| 2021/0293869 | A1* | 9/2021 | Kobayashi | G01R 31/2874 |
| 2021/0314925 | A1* | 10/2021 | Shin | H04W 72/042 |

FOREIGN PATENT DOCUMENTS

| | | | | |
|---|---|---|---|---|
| WO | WO-2019096802 | A1 * | 5/2019 | ......... H04B 17/0085 |
| WO | 2019225617 | A1 | 11/2019 | |

OTHER PUBLICATIONS

"3rd Generation Partnership Project; Technical Specification Group Radio Access Network; 5GS; User Equipment (UE) conformance specification; Part 2: Range 2 Standalone (Release 16)," (3GPP™) TS 38.521-2, V16.2.0, Mobile Competence Centre, France; Jan. 14, 2020, 479 pages.

* cited by examiner

METHOD OF MEASURING A TOTAL RADIATED POWER OF A DEVICE UNDER TEST AS WELL AS TEST SYSTEM

FIELD OF THE DISCLOSURE

Embodiments of the present disclosure relate to a method of measuring a total radiated power of a device under test by a test system. Further, embodiments of the present disclosure relate to a test system for measuring a total radiated power of a device under test.

BACKGROUND

Modern communication devices like mobile phones operate in the millimeter wave range (mmWave), wherein directive beam steered antenna elements are used by the modern communication devices in order to fulfill the respective requirements of modern telecommunication standards. When testing such a communication device, a total radiated power (TRP) measurement has to be performed in order to obtain the total radiated power of the device under test, which is a measure how much power is radiated by an antenna. In fact, the total received power of a receiver is calculated and summed up over all possible angles, wherein the result is the total radiated power. The TRP measurement is performed to characterize the respective communication device accordingly.

However, the TRP measurements are challenging due to the very directive beam steered antenna elements used by modern communication devices, when measuring the radiated power away from the center of the beam, namely away from the main lobe of the radiation pattern of the device under test.

So far, at least one link antenna in the near-field of the device under test is used for obtaining the total radiated power, wherein the link antenna is used to keep a signaling link stable during the TRP measurement. This, however, makes the entire test system and the testing of the device under test much more complex, resulting in increased costs.

Accordingly, there is a need for a simple and cost-efficient way to perform total radiated power measurements on a device under test.

SUMMARY

The present disclosure provides examples of a method of measuring a total radiated power (TRP) of a device under test by a test system having a base station simulator, a measurement antenna assigned to the base station simulator and control and/or measurement equipment. In an embodiment, the method comprises the steps of:

establishing a radio resource control (RRC) connection between the device under test and the base station simulator via the measurement antenna, activating an uplink-beam lock function at the device under test, performing a total radiated power (TRP) measurement by the control and/or measurement equipment while continuously sending a downlink signal from the base station simulator via the measurement antenna to the device under test.

Further, the present disclosure provides examples of a test system for measuring a total radiated power (TRP) of a device under test. In an embodiment, the test system comprises a device under test, a base station simulator, a measurement antenna assigned to the base station simulator and control and/or measurement equipment. A radio resource control (RRC) connection is established between the device under test and the base station simulator via the measurement antenna. An uplink-beam lock function is activated at the device under test. The test system is configured to perform a total radiated power (TRP) measurement of the device under test while continuously sending a downlink signal from the base station simulator via the measurement antenna to the device under test.

Accordingly, the main idea is based on the finding that no link antenna is necessary for performing the total radiated power measurement of the device under test, as the signaling link, for instance the signaling link according to 5G-NR FR2, is maintained. This can be ensured since the base station simulator continuously sends the respective downlink signal via the measurement antenna to the device under test that receives the respective downlink signal. The device under test assumes that the base station simulated by the base station simulator receives a respective uplink signal of the device under test. Therefore, the device under test continues to send the respective signals used for TRP measurement. In other words, the signaling link is maintained even though a respective upload-signal associated with the signaling link may be interrupted during the TRP measurement, for instance due to a relative orientation of the device under test with respect to the measurement antenna.

The uplink-lock beam function ensures that an uplink-beam and a downlink-beam of the device under test do not necessarily have to coincidence with each other. While activating the uplink-beam lock function at the device under test, the uplink-beam is locked while pointing to a determined fixed position with respect to the orientation of the device under test. This means that the uplink-beam of the device under test follows the relative orientation of the device under test during the total radiated power measurement, whereas the downlink-beam of the device under test is free to move.

Accordingly, the downlink-beam of the device under test is enabled to follow a signaling downlink established between the device under test and the base station simulator.

In other words, the downlink-beam of the device under test may be inclined with respect to the uplink-beam of the device under test depending on the relative orientation of the device under test with respect to the base station simulator, namely the measurement antenna connected thereto.

Generally, the activated uplink-beam lock function ensures that only the uplink-beam of the device under test is locked with respect to the orientation of the device under test, whereas the downlink-beam is maintained unlocked such that the downlink-beam may move relatively to the orientation of the device under test. This means that the downlink-beam of the device under test can still move in order to point towards the measurement antenna (via an optional reflector of the test system).

As mentioned above, the downlink signal continuously sent by the base station simulator ensures that the signaling link stays alive between the device under test and the base station simulator. Thus, the respective radiation pattern associated with the uplink pattern, namely the uplink lobes (main lobe and side lobes) of the device under test stays the same.

Thus, the entire test system is simplified, as the previously required link antenna placed in the near-field of the device under test can be omitted, resulting in less efforts when testing the device under test.

In general, the device under test may comprise an uplink-beam and a downlink-beam via which an uplink signal and a downlink signal may be transmitted. The respective signals can establish a signaling link, namely a signaling uplink or a signaling downlink, wherein the respective signaling link is established between the device under test and the measurement antenna assigned to the base station simulator.

According to an aspect, the base station simulator ignores any uplink signal transmitted by the device under test during the total radiated power measurement. The base station simulator sends the respective downlink signal irrespective of any uplink signal transmitted that may be received by the measurement antenna. The device under test may still transmit its uplink signals during the TRP measurement. However, the respective signal may be ignored by the base station simulator if it is received by the measurement antenna.

According to another aspect, the downlink signal continuously sent comprises an acknowledgement signal. The acknowledgement signal emulates an acknowledgement of an uplink signal of the device under test received by the base station simulator. However, the base station simulator does not acknowledge the actual receipt of such an uplink signal, but continuously sends the downlink signal in order to keep the signaling link alive between the device under test and the base station simulator.

In some embodiments, the acknowledgement signal is sent by the base station simulator without receiving a signal to be acknowledged. As mentioned above, the acknowledgement signal is sent in a continuous manner in any case. Accordingly, the acknowledgement signal is sent even though the base station simulator does not receive an uplink signal from the device under test. Even if the base station simulator receives an uplink signal from the device under test, the respective uplink signal is ignored or discarded by the base station simulator, as the downlink signal is sent anyway.

Furthermore, the downlink signal sent continuously comprises synchronization signal blocks (SSB). The synchronization signal blocks (SSB) may comprise data associated with a primary synchronization signal (PSS), a secondary synchronization signal (SSS) and a broadcast channel (BCH). The respective synchronization signal blocks ensure that the signaling link can be established, as it refers to, for example, a cell search concept in 5G. In some embodiments, the SSB may consist of 4-symbols, namely a 1-symbol PSS, a 1-symbol SSS, and a 2-symbol BCH.

In some embodiments, the device under test tunes to a certain frequency in the frequency range to be tested. The device under test tries to detect PSS and SSS. If the device under test fails to detect this, it tunes to the next frequency. Once the device under test successfully detects PSS and SSS, the device under test tries to decode BCH.

Furthermore, the device under test may be moved during the total radiated power measurement by a positioning system that supports the device under test. Thus, the device under test is placed on the positioning system, for instance a three-dimensional positioning system. During the total radiated power measurement of the device under test, the device under test is moved with respect to the measurement antenna such that the total radiated power can be measured appropriately since the device under test reaches several measurement positions.

The positioning system may be controlled by the control and/or measurement equipment.

Another aspect provides that an uplink-beam lock command is sent to the device under test to activate the uplink-beam lock function. The uplink-beam lock command may be sent by the base station simulator or the control and/or measurement equipment. In some embodiments, the control and/or measurement equipment controls the base station simulator to transmit the uplink-beam lock command. The device under test receives the respective command and processes the command appropriately such that the uplink-beam lock function is activated at the device under test.

Another aspect provides that a best beam selection process is performed prior to activating the uplink-beam lock function at the device under test. In some embodiments, the best beam selection process is performed prior to sending the uplink-beam lock command. The best beam selection process may also relate to a strongest beam determination, as the beam of the device under test is identified that provides best signaling characteristics. The TRP measurement is performed with the best beam or rather the strongest beam provided such that the respective beam is determined and selected previously.

According to another aspect, proper operation of the device under test is verified in a verification step by measuring the power associated with an uplink signal transmitted by the device under test. This may be done in continuous intervals or in arbitrary intervals. In some embodiments, it is checked whether or not the device under test is still active in order to ensure that a battery or power of the device under test did not run out during the TRP measurement.

For instance, the uplink-beam lock function is deactivated at the device under test in the verification step. Additionally or alternatively, the device under test is moved into a position that ensures reception of the uplink signal by the measurement antenna. Thus, the device under test may be moved back by the positioning system such that the uplink-beam is oriented (via the optional reflector) towards the measurement antenna. In this position, the uplink-beam and the downlink-beam coincidence with each other.

Furthermore, far-field characteristics of the device under test may be measured. In some embodiments, far-field conditions are provided directly or indirectly by a reflector. The reflector may be located in a signal path established between the device under test and the measurement antenna, wherein signals transmitted are reflected by the reflector in order to generate far-field conditions indirectly due to the longer travel distance established by the reflector.

An aspect provides that a reflector is located in the beam path between the measurement antenna and the device under test. The reflector provides indirect far-field conditions. The reflector may be a shaped reflector such that a focusing of the respective beams may take place. In general, the reflector reflects any incoming signal towards the device under test or the measurement antenna while extending the beam path provided between the device under test and the measurement antenna. Therefore, far-field conditions can be ensured even though the distance between the device under test and the measurement antenna is lower than the Fraunhofer distance.

Another aspect provides that the test system comprises a positioning system for the device under test. The positioning system may be a three-dimensional positioning system that is configured to move the device under test in three dimensions. This ensures that the TRP measurement can be performed in an appropriate manner, as the device under test is moved with respect to the measurement antenna accordingly, for example along a sphere on which the individual measurement points are provided.

The measurement antenna is generally configured to receive/transmit horizontally and/or vertically polarized signals.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
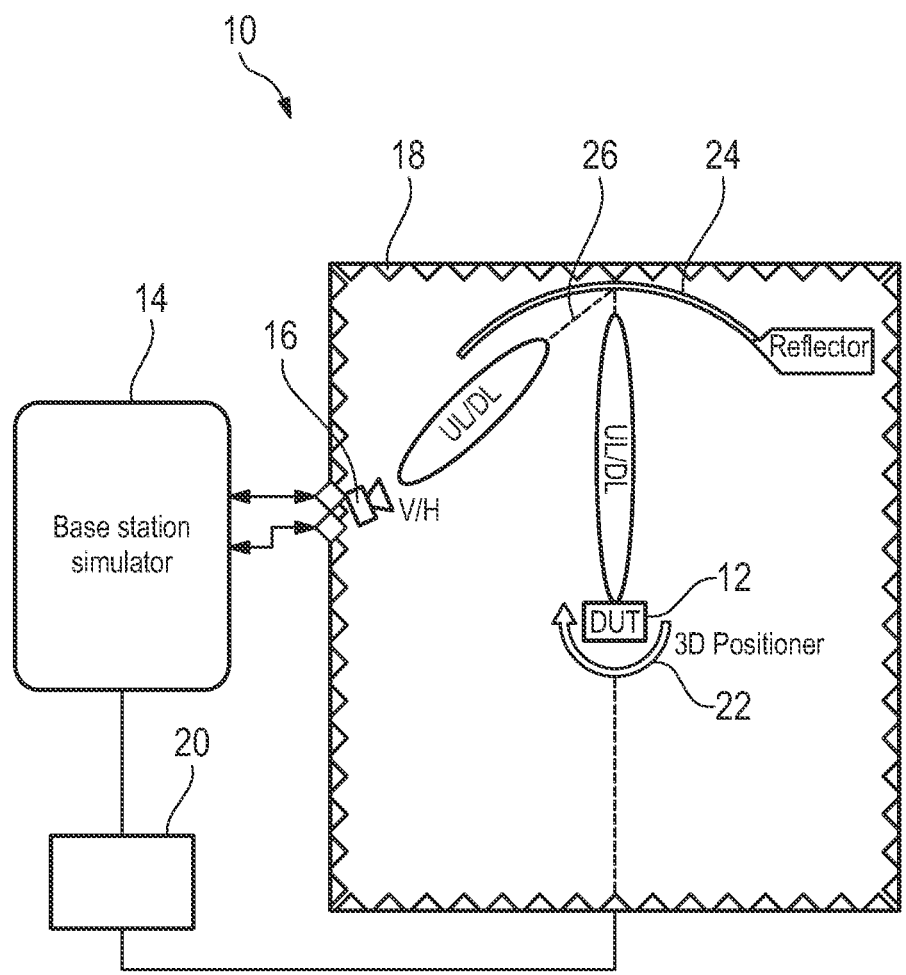
FIG. 1 schematically shows a test system according to an embodiment of the present disclosure in a first state during a total radiated power measurement.

In FIG. 1, a test system 10 for measuring a total radiated power of a device under test 12 is shown. The test system 10 comprises a base station simulator 14 that is configured to simulate a base station for the device under test 12, for instance a communication device to be tested. The base station simulator 14 is connected with a measurement antenna 16 that is assigned to the base station simulator 14, wherein the measurement antenna 16 is located within an anechoic chamber 18 of the test system 10.

The test system 10 also encompasses the device under test 12, whereas the base station simulator 14 itself may be located outside of the anechoic chamber 18. The test system 10 further comprises a control and/or measurement equipment 20 (e.g., one or more circuits) that is connected with the base station simulator 14 in order to control the base station simulator 14. Further, signals received by the measurement antenna 16 are forwarded to the base station simulator 14 via the base station simulator 14.

In some embodiments, a positioning system 22 is provided, wherein the device under test 12 is placed on the positioning system 22 such that the positioning system 22 is able to move the device under test 12 with respect to the measurement antenna 16. Thus, the relative orientation of the device under test 12 can be adapted. The positioning system 22 may be connected with the control and/or measurement equipment 20 such that the respective positioning is controlled by the control and/or measurement equipment 20 as indicated by the dashed line in FIG. 1.

In some embodiments, the positioning system 22 is a three-dimensional positioning system that is configured to move the device under test 12 in three dimensions, namely along a sphere. In some embodiments, the positioning system 22 includes one or more motorized stages configured to move the device under test 12 through any measurement point along a sphere upon receipt of suitable control signals transmitted by, for example, the control and/or measurement equipment 20. The device under test 12 is positioned at several different measurement points associated with the sphere during a total radiated power measurement, as will be described later when referring to FIG. 3.

The test system 10 may also comprise, in some embodiments, a reflector 24 that is located in a beam path 26 provided between the measurement antenna 16 and the device under test 12. In the shown embodiment, the reflector 24 is a shaped reflector. In general, the reflector 24 provides indirect far-field conditions such that the far-field characteristics of the device under test 12 can be tested even though the device under test 12 is distanced from the measurement antenna 16 by a distance lower than the Fraunhofer distance, namely in the respective near-field.

In FIG. 1, the test system 10 is shown in its initial state, in which the radiation of the device under test 12 is measured in beam. This means that the uplink-beam ("UL") and the downlink-beam ("DL") of the device under test 12 point towards the measurement antenna 16 via the reflector 24. Accordingly, the measurement antenna 16 can communicate with the device under test 12 in both directions.

Thus, a radio resource control (RRC) connection can be established between the device under test 12 and the base station simulator 14 via the measurement antenna 16. Therefore, a signaling link may be established between the device under test 12 and the base station simulator 14. The signaling link is assigned to a signaling uplink and a signaling downlink. This is also illustrated in FIG. 1 by the respective abbreviations UL and DL which are associated with the beam of the measurement antenna 16. In general, the measurement antenna 16 may receive/transmit horizontally and/or vertically polarized signals as indicated by "H" and V.

Figure 2:
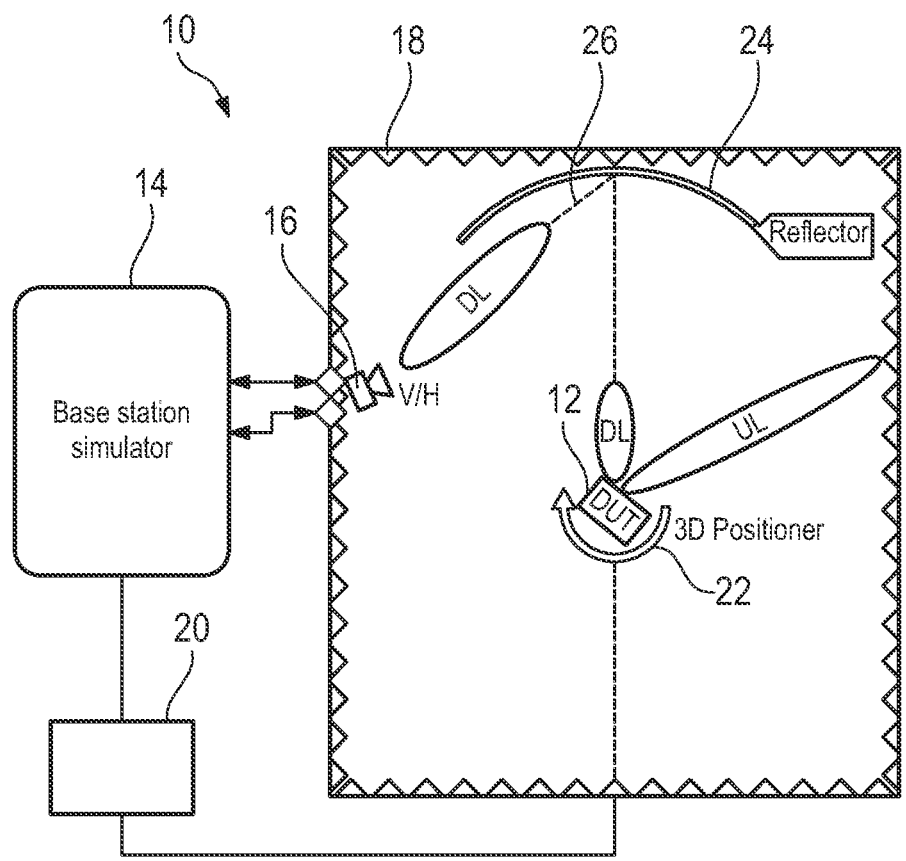
FIG. 2 schematically shows the test system of FIG. 1 in a second state of the total radiated power measurement.

In FIG. 2, another state of the test system 10 during the total radiated power measurement of the device under test 12 is shown, in which the device under test 12 has been moved relatively to the measurement antenna 16 by the positioning system 22.

In addition, an uplink-beam lock function has been activated at the device under test 12, as the upload-beam of the device under test 12 maintains its beam direction with respect to the orientation of the device under test 12. In other words, the uplink-beam of the device under test 12 has been turned by the same angle as the device under test 12 was turned by the positioning system 22.

In contrast, the downlink-beam of the device under test 12 was not turned, as the downlink-beam did not follow the movement of the device under test 12. Accordingly, the downlink-beam and the uplink-beam of the device under test 12 do not coincidence with each other anymore due to the uplink-beam lock function activated at the device under test 12 and the moving of the device under test 12 with respect to the measurement antenna 16.

Thus, the downlink-beam of the device under test 12 is still pointing towards the measurement antenna 16 via the reflector 24 such that the beam path 26 is maintained. Therefore, the signaling link is kept alive between the device under test 12 and the base station simulator 16, as the signaling downlink is maintained, which is indicated by the abbreviation "DL" associated with the beam of the measurement antenna 16.

However, the measurement antenna 16 may not receive any uplink signal from the device under test 12 anymore, as the uplink-beam of the device under test 12 is pointing away from the measurement antenna 16. Accordingly, it is very difficult to keep the signaling uplink alive because of the directivity of the antenna of the device under test 12. In some embodiments, the radiated energy of the uplink-beam in another direction as the main beam is very small such that the measurement antenna 16 do not receive any energy.

In order to maintain the signaling link established between the device under test 12 and the base station simulator 16 during the entire total radiated power measurement, the base station simulator 14 continuously sends a downlink signal via the measurement antenna 16 to the device under test 12.

The downlink signal comprises an acknowledgement signal such that it is emulated that an uplink signal of the device under test 12 is received by the measurement antenna 16, for example the base station simulator 14. In other words, the acknowledgement signal is sent by the base station simulator 14 without actually receiving a signal to be acknowledged from the device under test 12. Hence, the respective acknowledgement signal is sent blindly.

In some embodiments, the base station simulator 14 ignores any uplink signal transmitted by the device under test 12 during the total radiated power measurement even though it may receive the respective uplink signal at certain relative orientations. In some embodiments, the respective acknowledgement signal is transmitted in any case.

The downlink signal continuously sent keeps the signaling link, for example the signaling downlink, established between the device under test 12 and the base station simulator 14 alive during the entire total radiated power measurement, as the device under test 12 receives the downlink signals, for example the acknowledgement signals. Therefore, the device under test 12 assumes that a completely valid signaling link is established, namely a signaling uplink and a signaling downlink.

This is achieved since the uplink-beam lock function is activated at the device under test 12 such that the downlink-beam of the device under test 12 may maintain the signaling downlink with the measurement antenna 16, as the downlink-beam may point towards the measurement antenna 16 even though the uplink-beam points away.

The device under test 12 continuously receives the downlink signals from the base station simulator 14, for example acknowledgement signals. Thus, the device under test 12 assumes that the signaling link is still maintained. Accordingly, the device under test 12 maintains transmitting signals in every direction such that the total radiated power of the device under test 12 can be measured even though the uplink-beam of the device under test 12 is pointing away from the measurement antenna 16 and/or the reflector 24.

The downlink signal may also comprise synchronization signal blocks (SSB), for instance data associated with a primary synchronization signal (PSS), a secondary synchronization signal (SSS) and a broadcast channel (BCH).

Prior to activating the uplink-beam lock function, which may be done by an uplink-beam lock command issued by the base station simulator 14 and/or the control and/or measurement equipment 20, a best beam selection process may be performed in order to identify the respective beam of the device under test 12 to be used for the total radiated power measurement.

In addition, verification steps may be performed, in which proper operation of the device under test 12 is verified by measuring the power associated with an uplink signal transmitted by the device under test 12.

During the verification steps, the uplink-beam lock function may be de-activated and/or the device under test 12 may be moved by the positioning system 22 into a position that ensures reception of the uplink signal by the measurement antenna 14. Hence, the device under test 12 may be moved back into its initial state shown in FIG. 1, in which the signaling link is ensured without any simulated downlink signals by the base station simulator 14.

Figure 3:
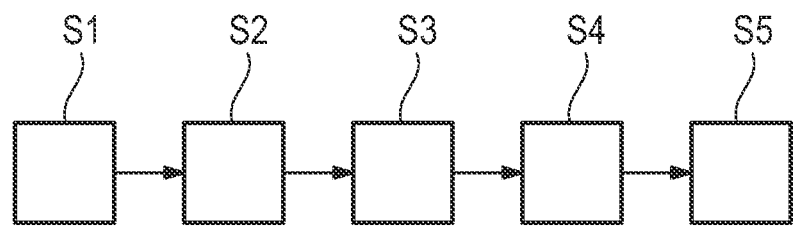
FIG. 3 shows a flow-chart illustrating a method of measuring a total radiated power of the device under test according to an embodiment of the present disclosure.

The test system 10 shown in FIGS. 1 and 2 can be used to perform a method of measuring a total radiated power of the device under test 12, an embodiment of which is shown in FIG. 3.

In a first step S1, a radio resource control connection is established between the device under test 12 and the base station simulator 14 via the measurement antenna 16.

In a second step S2, a measurement of the total radiated power measurement is performed by the control and/or measurement equipment in the initial state shown in FIG. 1 is performed.

In a third step S3, an uplink-beam lock function is activated at the device under test 12.

In a fourth step S4, the device under test 12 is moved to another measurement position by the positioning system 22. The respective state may relate to the one shown in FIG. 2.

In a fifth step S5, a further measurement of the total radiated power measurement is performed by the control and/or measurement equipment 20.

The device under test 12 is moved to further measurement positions wherein further measurements are performed, while the base station simulator 14 continuously sends the downlink signal via the measurement antenna 16 to the device under test 12 in order to keep the signaling link alive.

In general, the test system 10 as well as the method of measuring the total radiated power ensure a simple and cost-efficient way to measure the total radiated power of a device under test 12, as no additional link antenna is required.

In some embodiments, the link antenna can be avoided due to the uplink-beam lock function activated at the device under test 12 and the continuously transmission of the downlink signal from the base station simulator 14 to the device under test 12, for example simulating acknowledgement of uplink signals received from the device under test 12.

Certain embodiments disclosed herein, for example the respective base station simulator 14, control and/or measurement equipment 20, etc., utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions.

Of course, in some embodiments, two or more of these components, or parts thereof, can be integrated or share hardware and/or software, circuitry, etc. In some embodiments, these components, or parts thereof, may be grouped in a single location or distributed over a wide area. In circumstances were the components are distributed, the components are accessible to each other via communication links.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A method of measuring a total radiated power of a device under test by a test system having a base station simulator, a measurement antenna assigned to the base station simulator and a control and/or measurement equipment, wherein the method comprises:
    establishing a radio resource control connection between the device under test and the base station simulator via the measurement antenna;
    activating an uplink-beam lock function at the device under test; and
    performing a total radiated power measurement by the control and/or measurement equipment while continuously sending a downlink signal from the base station simulator via the measurement antenna to the device under test,
    wherein the downlink signal continuously sent comprises an acknowledgement signal.

2. The method according to claim 1, wherein the base station simulator ignores any uplink signal transmitted by the device under test during the total radiated power measurement.

3. The method according to claim 1, wherein the acknowledgement signal is sent by the base station simulator without receiving a signal to be acknowledged.

4. The method according to claim 1, wherein the downlink signal sent continuously comprises synchronization signal blocks.

5. The method according to claim 4, wherein the synchronization signal blocks comprise data associated with a primary synchronization signal, a secondary synchronization signal and a broadcast channel.

6. The method according to claim 1, wherein the device under test is moved during the total radiated power measurement by a positioning system supporting the device under test.

7. The method according to claim 1, wherein an uplink-beam lock command is sent to the device under test to activate the uplink-beam lock function.

8. The method according to claim 1, wherein a best beam selection process is performed prior to activating the uplink-beam lock function at the device under test.

9. The method according to claim 8, wherein the uplink-beam lock function is deactivated at the device under test in the verification step, and/or wherein the device under test is moved into a position that ensures reception of the uplink signal by the measurement antenna.

10. The method according to claim 1, wherein a best beam selection process is performed prior to sending the uplink-beam lock command.

11. The method according to claim 1, wherein, in a verification step, proper operation of the device under test is verified by measuring the power associated with an uplink signal transmitted by the device under test.

12. The method according to claim 1, wherein far-field characteristics of the device under test are measured.

13. The method according to claim 1, wherein far-field conditions are provided directly or indirectly by a reflector.

14. A test system for measuring a total radiated power of a device under test, comprising:
    a device under test;
    a base station simulator;
    a measurement antenna assigned to the base station simulator; and
    a control and/or measurement equipment,
    wherein a radio resource control connection is established between the device under test and the base station simulator via the measurement antenna, wherein an uplink-beam lock function is activated at the device under test, and wherein the test system is configured to perform a total radiated power measurement of the device under test while continuously sending a downlink signal from the base station simulator via the measurement antenna to the device under test, wherein the downlink signal continuously sent comprises an acknowledgement signal.

15. The test system according to claim 14, wherein a reflector is located in a beam path between the measurement antenna and the device under test.

16. The test system according to claim 14, wherein a shaped reflector is located in a beam path between the measurement antenna and the device under test, wherein the reflector provides indirect far-field conditions.

17. The test system according to claim 14, wherein the test system comprises a positioning system for the device under test.

18. The test system according to claim 17, wherein the positioning system is a three-dimensional positioning system that is configured to move the device under test in three dimensions.

\* \* \* \* \*